United States Patent [19]
Eberhardt et al.

[11] 4,024,886
[45] May 24, 1977

[54] ROTARY VALVE

[75] Inventors: H. Alfred Eberhardt, Paoli; Kenneth F. Hoffman, Collegeville; Raymond R. Petersen, Meadowbrook, all of Pa.

[73] Assignee: Hale Fire Pump Company, Conshohocken, Pa.

[22] Filed: Apr. 29, 1976

[21] Appl. No.: 681,597

[52] U.S. Cl. .................................. 137/270; 251/77
[51] Int. Cl.² ........................................ F16K 31/52
[58] Field of Search ............. 137/270; 251/77, 208

[56] References Cited
UNITED STATES PATENTS 3,198,477  8/1965  Allenbaugh, Jr. .................... 251/77
3,358,962  12/1967  Johnson ................................ 251/77

Primary Examiner—Arnold Rosenthal
Attorney, Agent, or Firm—Smith, Harding, Earley & Follmer

[57] ABSTRACT

An in-line ball valve having a locking device which permits the positioning of the valve member to a set position by operation of a valve handle with the valve member being locked in this position against any creeping movement by reason of flow-induced forces acting on the valve member. The valve also includes a handle design which permits the handle to be positioned on the shaft of the valve member in eight different handle configurations to provide for simplicity of installation and ease of adaptability to push-pull controls.

13 Claims, 11 Drawing Figures

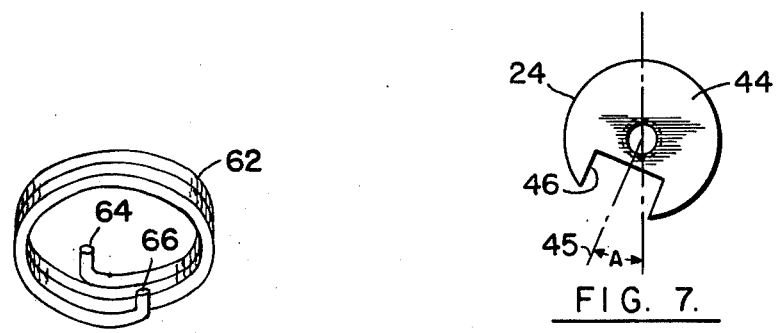
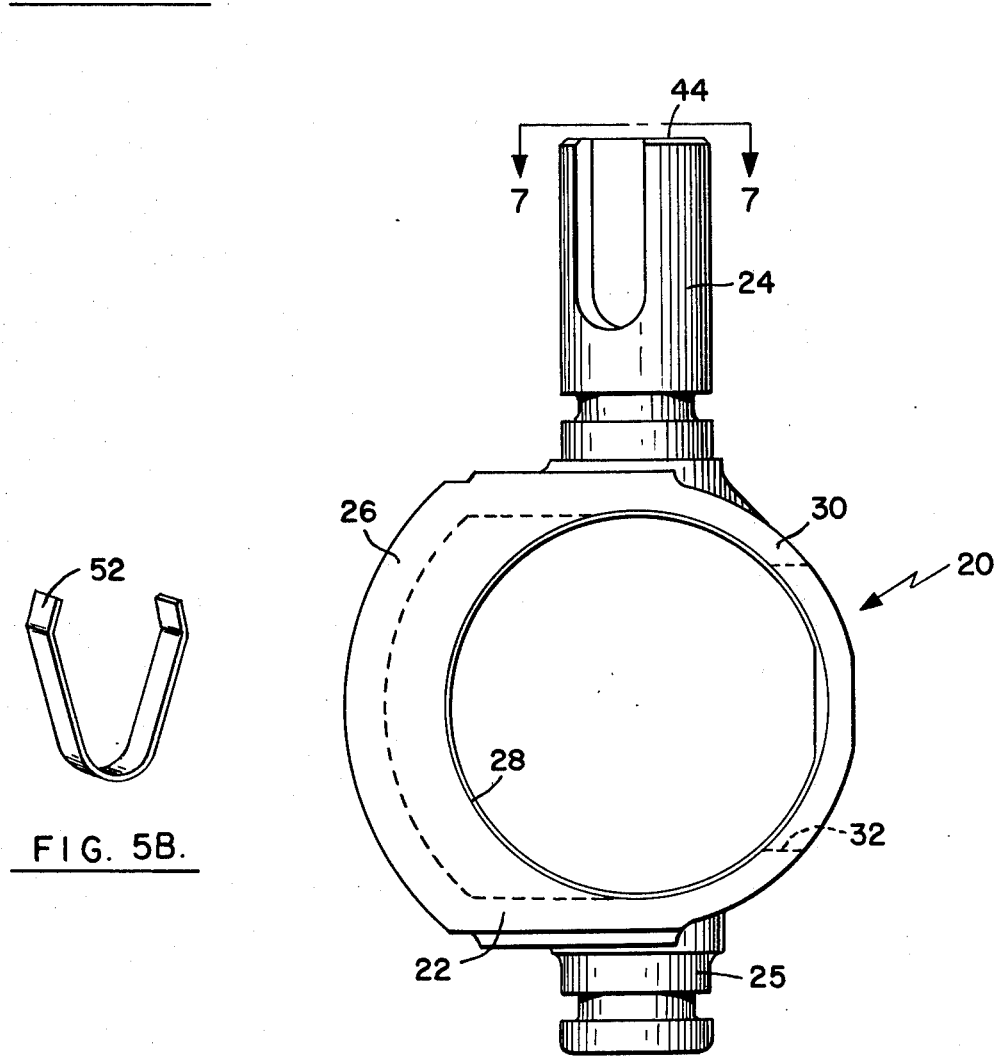

ROTARY VALVE

BACKGROUND OF THE INVENTION

A long standing problem associated with rotary valves, such as in-line ball valves, is that flow-induced hydraulic forces developed when the valve is positioned in a partially opened position can cause the ball valve member to creep from the set position thereof and actually shut. While a twist lock handle can be used to secure the valve member in its set position, this type of lock is not suitable for applications where the valve is not accessible to the operator. Accordingly, there is a need for a locking device which can be used in all applications of a rotary valve.

One device that has been used involves the provision of a coil spring which is responsive to the flow-induced movement of the valve member to move to a locking position preventing movement of the valve member. The coil spring is moved to a non-locking position when the valve member is moved by a separate stem portion connected to a handle to permit the adjustment of the valve member to a desired flow controlling position. However, this prior art locking mechanism involves the use of an excessive number of complicated parts and is thus expensive. Also, the device is subjected to wear because of the high forces caused to operate between the coil spring and the valve stem.

Another problem associated with rotary valves which are to be used in remote inaccessible locations is that of making them adaptable to be adjusted by rods attached to the handle. To this end, it is desirable to have a handle which can be positioned to a plurality of different handle configurations.

SUMMARY OF THE INVENTION

It is the general object of the invention to provide a rotary valve design which encompasses a locking device of the above-indicated type which is simple in construction and which is resistant to wear under the high forces involved. The locking device in accordance with the invention permits the positioning of the valve member to a set position by operation of a valve handle with the valve member being locked in this position against any creeping movement by reason of forces acting on the valve member.

Another object of the invention is to provide a versatile handle design which permis the handle to be positioned in eight different handle configurations from the open to the closed position of the valve to thereby provide for simplicity of installation and ease of adaptability to push-pull controls. The handle in accordance with the invention can be changed from one configuration to another very quickly and by means of a simple design.

A feature of the valve in accordance with the invention is the provision of a wear spring which exerts pressure on the key between the handle and the valve stem to restrain the handle and eliminate handle backlash associated with the lost motion connection incorporated in the locking mechanism. This avoids the problems of handle backlash which would result in vibration and noise and would be particularly undesirable in vehicular applications.

Another feature of the valve in accordance with the invention is the provision of means for adjustment of the handle relative to the handle stop for adjusting the handle closed position. This serves to increase the life of the valve and adjust for various tolerances in the construction of the parts. The adjustment means also serves to insure the attainment of an effective seal between the ball and the seat to compensate for component wear.

The above and other features of the invention will become apparent from a consideration of the following detailed description.

BRIEF DESCRIPTION OF THE DRAWINGS

FIG. 5A is a detail view of a torsion spring employed in the valve shown in FIG. 1;

FIG. 5B is a detail view of a wear spring employed in the valve shown in FIG. 1;

FIG. 6 is a view of an integral one-piece ball and shaft employed in the valve in accordance with the invention;

FIG. 7 is a top end view of the shaft portion of FIG. 6;

DETAILED DESCRIPTION OF THE PREFERRED EMBODIMENT

Figure 1:
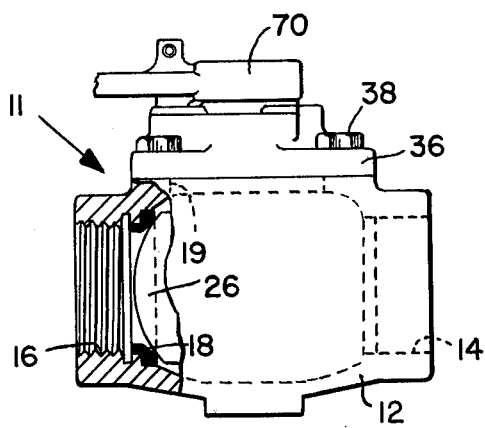
FIG. 1 is a front view of an in-line ball valve in accordance with the invention.

Referring to FIG. 1 of the drawings, there is shown an in-line ball valve 11 comprising the locking device in accordance with the invention. The valve 11 comprises a valve body 12 provided with an inlet 14 and an outlet 16 provided with female pipe threads for connection to suitable in-line pipes or conduits. A suitable 0-ring type valve seat 18 is inserted within the valve body 12 adjacent outlet 16. The valve body 12 is provided with a top opening 19 to permit insertion of a valve member 20 shown in FIG. 6.

The valve member 20 is an integral one-piece ball and shaft comprising a ball portion 22 and a shaft portion 24. The ball portion 22 has a generally truncated hollow spherical configuration including a spherical side wall 26, a generally cylindrical internal flow passage 28 having aligned circular end ports and a side wall 30 opposite spherical side wall 26. The side wall 30 is provided with a large port 32 which extends on an axis transverse to the axis of the flow passage 28. The port 32 serves to reduce the effects of the hydraulic forces acting on the ball portion 22 tending to move the same from a set position.

Figure 2:
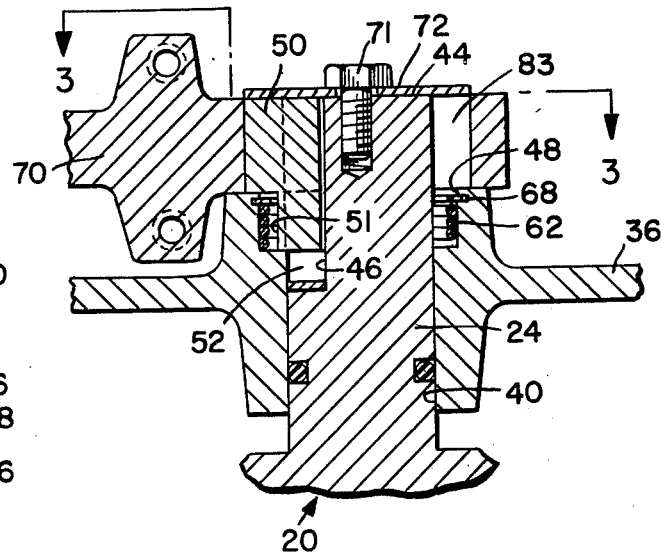
FIG. 2 is an enlarged fragmentary sectional view of the locking means employed in the valve shown in FIG. 1 and taken generally on line 2—2 of FIG. 3.

A cover 36 is removably mounted on the top of valve body 12 by means of suitable mounting bolts 38 and serves to enclose the top opening 19. The shaft portion 24 of the valve member 20 projects through a bore 40 in the cover 36 for rotatable support therein, as is best shown in FIG. 2.

The valve member 20 is provided with a lower trunnion portion 25 adapted to be received in a bottom opening in the valve body 12 to permit, in conventional fashion, the valve member 20 to be rotatably supported. The spherical side wall 26 of the valve member 20 cooperates with the valve seat 18 to control the flow between the inlet 14 and the outlet 16 as is conventional in ball valves.

It will be apparent that the removable valve cover 36 permits ease of servicing of the valve member 20. The valve body 12 does not have to be disconnected or removed from the piping line since, by simply removing the valve cover 36, every part that needs servicing is exposed. Moreover, the integral one-piece ball and shaft construction provides maximum strength and rigidity and a minimum of deflection. This insures a continuous, homogeneous sealing surface which produces a reliable seal under both high operating pressure and high vacuum requirements.

The shaft portion 24 of valve member 20 is provided with a longitudinally extending slot 46 in the periphery extending downwardly from the top end 44 thereof. The central radius 45 of the slot 46 extends at an acute angle "A" of 22 ½° to the longitudinal axis of the internal flow passage of the valve member 20 which is apprent from a consideration of FIGS. 6 and 7. This angular relation permits the proper cooperation of the shaft portion 24 of the valve member 20 with the novel handle construction to be described hereafter.

Figure 3:
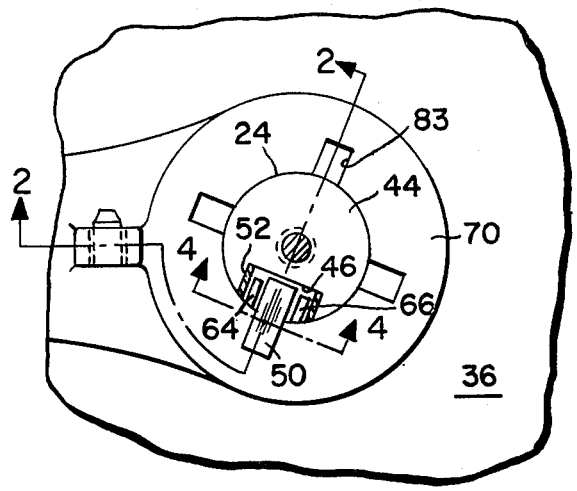
FIG. 3 is a sectional view taken generally on line 3—3 of FIG. 2.

The cover is provided with a counterbore 48 forming an annular recess encircling the shaft portion 24 in the region of the slot 46 as is best shown in FIG. 2. A key 50 is positioned within the slot 46 and extends from the upper end of the slot 46 into the portion thereof encircled by bore 48. The key 50 has an enlarged upper end which projects radially outwardly from the periphery of the shaft portion 24 for engagement within a keyway formed in a valve handle as will be described hereafter. As is shown in FIG. 3, the key 50 fits loosely within the slot 46 which is almost three times wider than key 50. This provides for a lost motion connection between the key 50 and the shaft portion 24 as will be described more fully hereafter.

A wear spring 52 is mounted in the slot 46 to bias the key 50 to a restrained position. FIG. 5B is a detail view of spring 52 prior to insertion into slot 46. The spring 52 has a bow configuration with a pair of curved legs 53 and 54 joined at a base 55. The legs 53 and 54 are positioned to extend along the side walls of the slot 46 and come into contact at their ends with the key 50 to bias the same to a position approximately midway between the side walls of the slot 46 under normal conditions. The base 55 of the wear spring 52 is located in the arcuate bottom end 47 of slot 46 underneath the lower end of the key 50.

A locking coil spring 62 is mounted in the annular recess provided by the counterbore 48. Locking spring 62 is a torsion spring which has a free diameter slightly larger than the diameter of the counterbore 48 so that it is mounted in a tensioned condition within the counterbore 48. At the ends of the locking spring 62 there are provided two inwardly extending tangs 64 and 66 which extend approximately parallel to one another when the locking spring 62 is restrained in the counterbore 48. Each end of the locking spring 62 extends across the outer wall 51 of the key 50 and turns inwardly to form a tang 64 or 66, whereby the spring ends wrap around the key 50. The locking spring 62 is constructed to be self-locking torsionally when positioned within the counterbore 48 and force is exerted on tang 64 or tang 66 in a direction to increase the coil diameter but to be rotatable within the counterbore 48 upon the application of a tangential force on either tang 64 or 66 in a direction to decrease the coil diameter and release the locking pressure.

Figure 4:
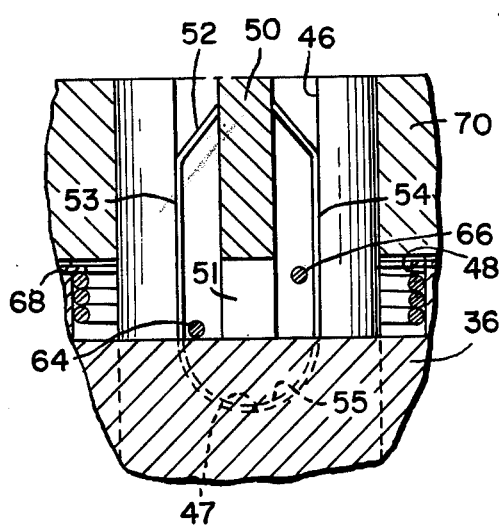
FIG. 4 is a sectional view taken generally on line 4—4 of FIG. 3.

As is apparent from FIG. 4, the tang 64 and 66 extend into the slot 46 at locations between the legs 53 and 54 of the wear spring 52 and the side walls of the key 50. In the assembled position of the locking spring 62, as shown in FIGS. 2 and 3, the tangs 64 and 66 are positioned loosely between the wear spring side legs 53 and 54 so those legs will tend to increase the spring coil diameter when either one pushes against a spring tang.

A snap ring 68 is mounted in the cover 36 at the upper end of the counterbore 48 to retain the locking spring 62 within the counterbore 48.

A valve handle 70 is mounted on the upper end of the shaft portion 24 with the key 50 extending in one of the keyways formed therein. The handle 70 is held in position by a hold-down screw 71 which cooperates with a shaft washer 72 which overlaps the handle keyways to prevent dirt and contaminants from entering the locking device. The handle 70 is used to cause rotation of valve member 20 by way of the key 50 and the lost motion connection between the key 50 and the shaft member 24.

The locking device in accordance with the invention operates to secure the valve member 20 in any set position, including a partially open position, against the hydraulic forces produced by the flow of fluid through the valve 11 which tend to cause the valve member 20 to creep from its set position. The locking device is also operable to release the locking action on the valve member 20 when the handle 70 is turned to thereby allow the valve member 20 to be changed from one flow setting to another flow setting. The operation of the locking device to accomplish the aforementioned results is described hereafter.

If the valve member 20 were set to a partially open position such that the hydraulic forces produced by the flow of the fluid through the valve would tend to cause the valve member to rotate from this set position, it will be apparent that as the shaft portion 24 would start to rotate, one of the side walls of the slot 46 moves to urge an adjacent tang 64 or 66 of the locking spring 62, by way of the wear spring 52, in a direction which would tend to increase the coil diameter of the locking spring 62. However, since the locking spring 62 is already confined within the counterbore 48 in a self-locking tensioned condition, any movement of the shaft portion 24 would be restricted by the action of the locking spring 62. Hence, the locking spring 62 prevents the shaft portion 24 from rotating, wherefore the valve member 20 is held in its set position by this locking action of the locking spring 62 against th stationary counterbore 48.

On the other hand, if it were desired to adjust the position of the valve member by way of the valve handle 70, this adjustment will be permitted by the locking device. To this end, as the handle 70 is moved through an adjusting rotating movement, the key 50, which is keyed to the handle 70, rotates about the longitudinal axis of the shaft 24. After moving through the space in the lost motion connection, the key 50 comes into contact with a tang 64 or 66 of the locking spring 62 and the key 50 exerts a force on this contacted tang to cause the spring diameter to decrease. This releases the preload pressure on the walls of the counterbore 48 by the locking spring 62 an amount to allow the locking spring 62 to rotate freely in the counterbore 48 along with the shaft portion 24 of the valve member 20. Accordingly, the valve member 20 is also adjusted to the desired flow controlling position by the action of rotating of the handle 70. It will be noted that the wear spring 52 improves the wear properties of the locking device by reason of being positioned between the tangs 64 and 66 and the side walls of the slot 46. In addition, the wear spring 52 exerts pressure on the key 50 to restrain the handle 70 keyed thereto and eliminate handle backlash associated with the lost motion connection incorporated in the locking device. The hardened key 50 and wear spring 52 provide hard, long wearing surfaces to withstand the large stresses set up by the action of the locking spring 62 during use.

Figure 8:
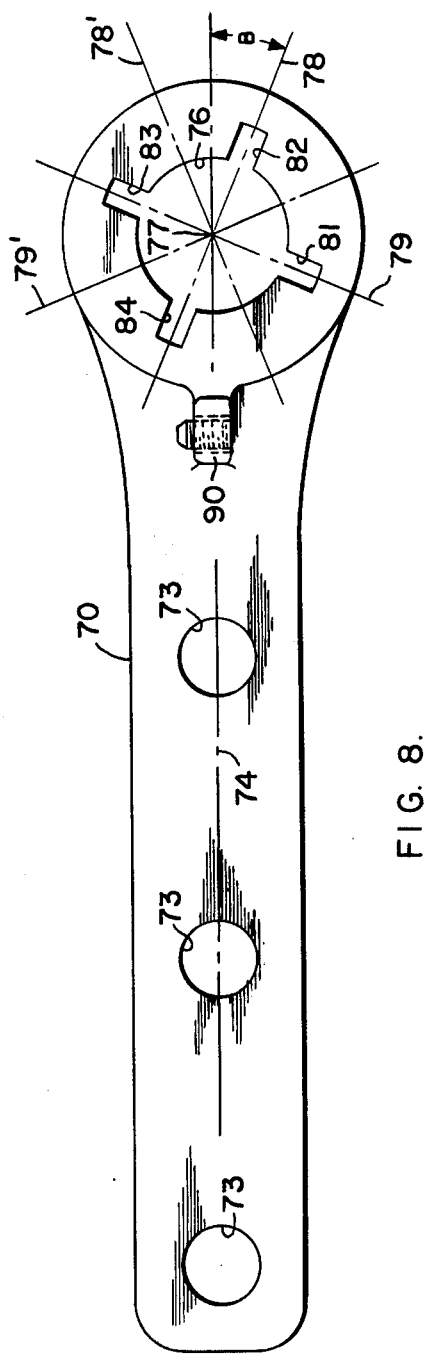
FIG. 8 is a plan view of a handle employed in the valve in accordance with the invention.
Figure 9:
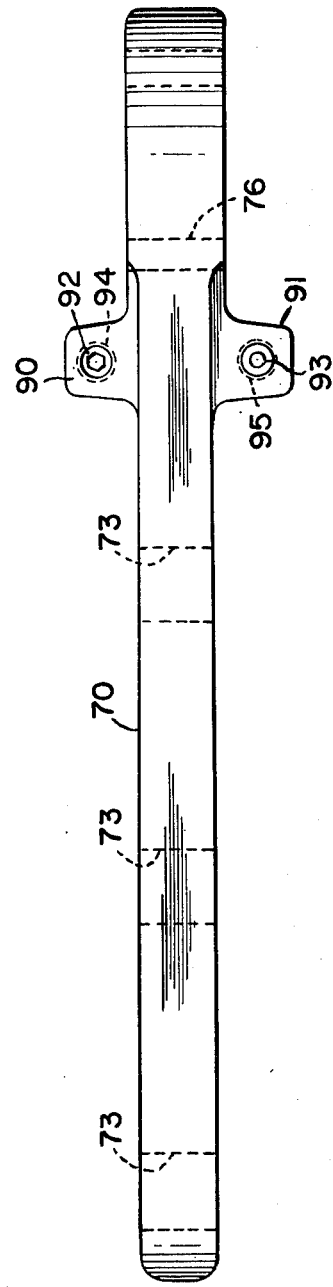
FIG. 9 is a side view of the handle shown in FIG. 8.
Figure 10:
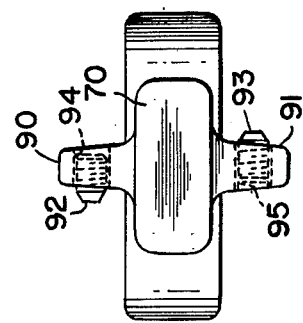
FIG. 10 is an end view taken from the left of FIG. 9.

The valve in accordance with the invention is provided with a novel handle design best shown in FIGS. 8 to 10. The valve handle 70 is provided with three holes 73 spaced along the longitudinal axis 74 thereof. The holes 73 are used for connecting the handle 70 to push-pull rods for remote operation of the valve. Handle 70 is provided with a bore 76 adapted to receive the shaft portion 24 of the valve member 20, and with four circumferentially equally spaced keyways 81–84 adapted to receive the key 50. Oppositely disposed keyways 82 and 84 are centered on a line 78 which passes through the center 77 of bore 76 and extends at an acute angle "B" of 22 ½° with respect to the longitudinal axis 74 of the handle 70. Oppositely disposed keyways 82 and 84 are centered on a line 79 which extends at ar right angle to line 78.

The handle 70 may be mounted on the key 50 to extend in eight different angular configurations relative to the shaft portion 24 of the valve member 20. The handle 70 may be positioned at four ninety degree angular positions when mounted on the shaft portion 24 in the orientation shown in FIGS. 8 and 9 as is apparent from a consideration of these figures. Also, by turning the handle over to present the other side onto the shaft portion 24, the keyways 81–84 will be centered on the lines 78' and 79' which, as is apparent from FIG. 8, are midway between the lines 78 and 79. Accordingly, this arrangement gives a flexibility to position the handle at 45 degree intervals about the circumference of the shaft portion 24.

In order that the handle 70 may be used on either side, there are provided two handle stops 90 and 91 which project from opposite sides of the handle 70 for cooperation with cover stops as is conventional in the art. A pair of set screws 92 and 93 are mounted within threaded holes 94 and 95 in the stops 90 and 91, respectively, for adjustment to set positions on the stops 90 and 91 to thereby engage the cover stops at various set positions. This adjustment of the set screws 92 and 93 provides for an additional adjustment to increase the life of the valve and adjust for various tolerances in the case handle stops 90 and 91 and the stops on the cover 36. By turning the set screws 92 and 93 to position the same relative to the handle stops 90 and 91, the operative position of the handle 70 relative to the cover stop can be adjusted to insure achieving an effective seal between the valve member 20 and the seat 18 in the closed position of the valve and also to thereby compensate for wear of the stops during use.

The handle design permitting the setting of the handle 70 to eight different angles relative to the shaft portion 24 of the valve member 20 provides for simplicity of installation of the valve and the ease of adaptability thereof for a multiplicity of push-pull control arrangements. Changing from one handle position to another is accomplished by removing the hold-down screw 71 and the handle 70 and/or repositioning the valve cover 36 so that the handle stops on the cover correspond to the desired new handle position, at which time the handle 70 is repositioned on the shaft portion 24 with one of the keyways 81–84 engaging the key 50 and one of the handle stops 90 or 91 arranged to cooperate with a stop on the cover.

We claim:

1. A valve comprising: a body having an inlet and an outlet, a valve member rotatable within said body to various positions to control the flow between said inlet and said outlet, a cover mounted on said body and having a bore therein, said valve member having a shaft portion extending through said bore in said cover to the exterior of the valve, a handle having a bore receiving said shaft portion therein, a longitudinally extending slot formed on the periphery of said shaft portion, said handle having a keyway formed therein in opposed relation with said slot in said shaft portion, a key received in said slot in said shaft portion and in said keyway providing a lost motion connection between said handle and said shaft portion, an annular recess in said cover encircling said shaft portion in the region of said slot therein, a coil spring mounted in said recess under a tensioned condition in contact with the outer wall of said recess, said coil spring having a tang formed at each end thereof, one of said tangs extending into said slot between said key and one side wall of said slot, the other of said tangs extending into slot between said key and the other side wall of said slot, said tangs being constructed and arranged to be moved in a direction to decrease the coil diameter of said coil spring in response to the rotating movement of said key by said handle and to be moved in a direction to increase the coil diameter of said spring in response to rotating movement of the side walls of said slot on said shaft portion.

2. A valve according to claim 1 wherein said coil spring comprises a locking torsion spring set in a preloaded condition within said annular recess.

3. A valve according to claim 2 wherein the width of the portion of the key within said slot permits a lost motion movement of the key between the tangs on each side thereof.

4. A valve according to claim 3 including a second spring positioned in said slot and biasing said key to a restrained position to thereby restrain movement of said handle and prevent handle backlash.

5. A valve according to claim 3 including a flat spring positioned in said slot to bias said key to a restrained position, said flat spring having portions extending between each of said tangs and the adjacent side wall of said slot, said flat spring being made of a hardened material to provide hard wearing surfaces in contact with said tangs for withstanding the stresses provided by the action of said locking spring.

6. A valve according to claim 5 wherein said flat spring has a first leg portion extending between one tang and said one side wall of said slot, a second leg portion extending between the other tang and said other side wall portion of said slot, and a base joining said first and second leg portions and extending underneath said key.

7. A valve according to claim 1 wherein said valve member is in the form of a ball valve configuration having a spherical wall adapted to cooperate with a valve seat for controlling flow between said inlet and outlet, an internal passage extending transversely to said spherical wall for directing flow between said inlet and said outlet when said valve member is in an open position, and a wall opposite said spherical wall having a large port therein extending transversely to said internal passage.

8. A valve according to claim 1 wherein said handle is provided with four circumferentially equally spaced keyways each adapted to receive said key, said keyways being arranged in two pairs of oppositely disposed keyways, one pair of oppositely disposed keyways being centered on a line which extends at an acute angle to the longitudinal axis of said handle.

9. A valve according to claim 8 wherein said handle is adapted to be mounted on said shaft portion with either side of the handle facing the valve body, said acute angle being about 22 ½° whereby said handle is mountable on said shaft portion with said key engaged in said keyway to extend in eight different angular configurations relative thereto and spaced apart by 45°.

10. A valve according to claim 9 wherein said handle is provided with stops projecting from opposite sides of said handle, each of said stops having a set screw adjustably mounted therein for adjustably setting the stop position thereof.

11. A valve comprising a body having an inlet and an outlet, a valve member rotatable within said body to various positions to control the flow between said inlet and said outlet, said valve member having a shaft portion extending to the exterior of the valve body, a handle having a bore receiving said shaft portion therein, a longitudinally extending slot formed in the periphery of said shaft portion, and a key received in said slot in said shaft portion, said handle having four circumferentially equally spaced keyways each adapted to receive said key, said keyways being arranged in two pairs of oppositely disposed keyways, one pair of said oppositely disposed keyways being centered on a line which extends at an acute angle to the longitudinal axis of said handle.

12. A valve according to claim 11 wherein said handle is adapted to be mounted on said shaft portion with either side facing said valve body, said acute angle being about 22 ½° whereby said handle is mountable on said shaft portion with said key engaged in a keyway to extend in eight different configurations relative thereto and spaced apart by 45°.

13. A valve according to claim 12 wherein said handle is provided with a pair of stops, one stop projecting from each side of the handle, each of said stops having a set screw adjustably mounted therein for adjustably setting the stop position thereof.

* * * * *